Figure 1:
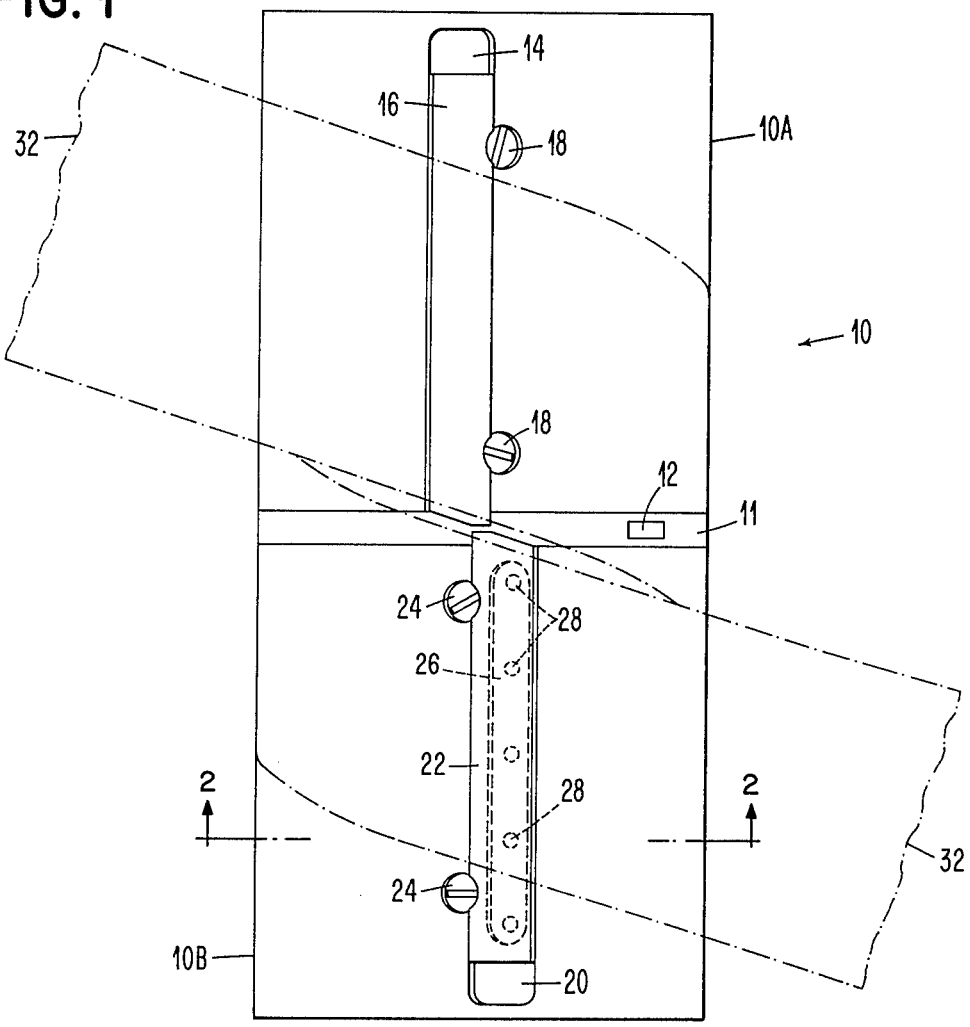
Figure 2:
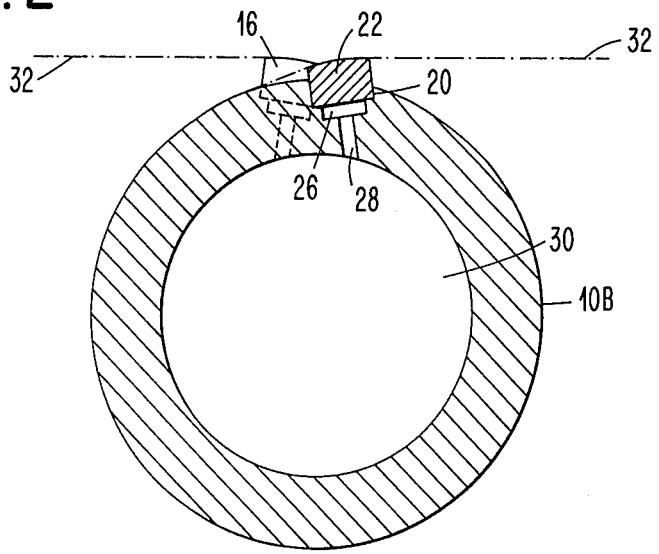
Figure 3:
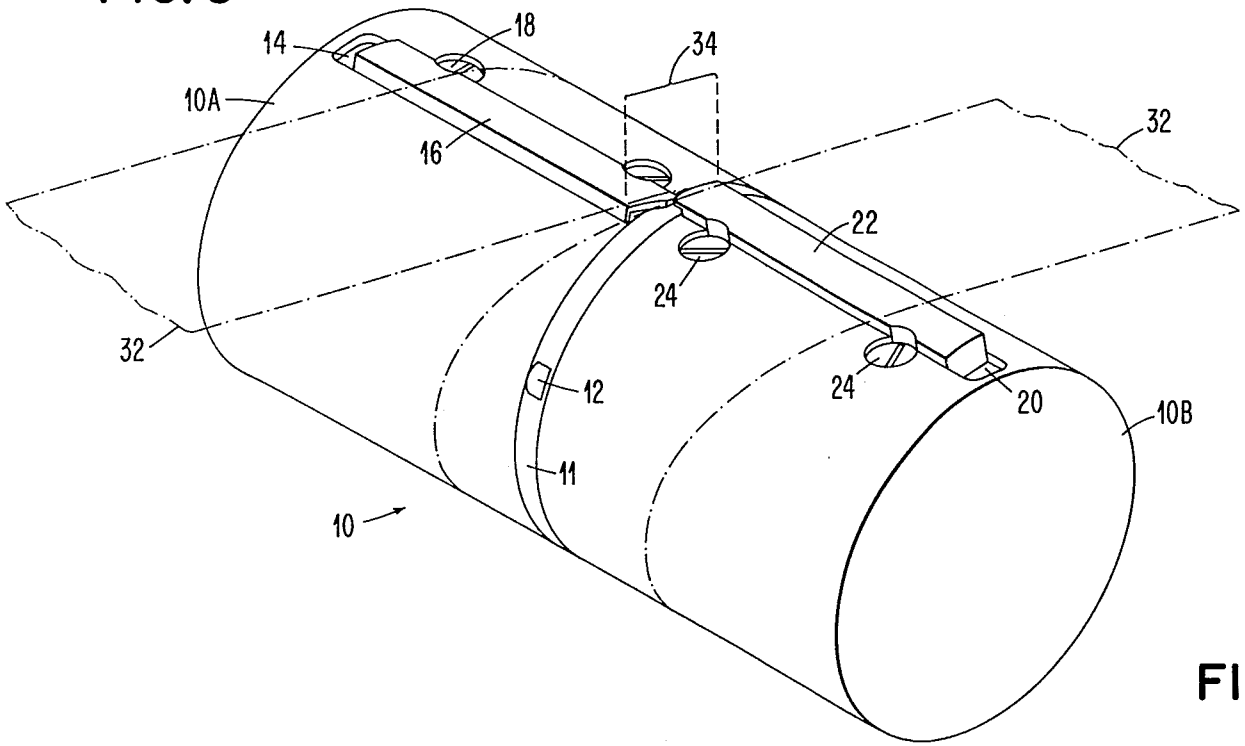
Figure 4:
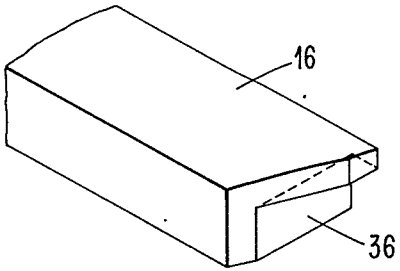

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED DECEMBER 2, 1975

941 O.G. 10

T941,022

APPARATUS FOR LIFTING TAPE EDGES ABOVE PATH OF ROTATING HEAD

Frederic F. Freeman, Boulder County, and Ernest P. Kollar, Weld County, Colo., assignors to International Business Machines Corporation, Armonk, N.Y.

Filed Dec. 23, 1974, Ser. No. 535,407

Int. Cl. G11b *15/60*

U.S. Cl. 360—130

2 Sheets Drawing. 6 Pages Specification

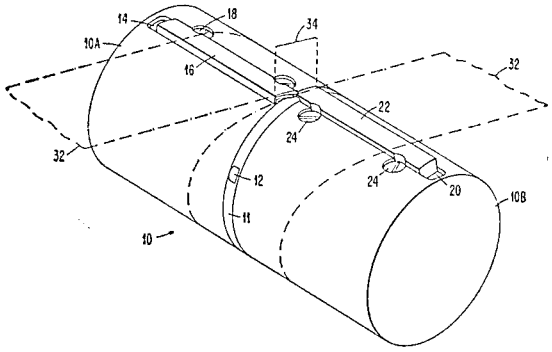

Disclosed herein is a mandrel 10A and 10B on which tape 32 is helically wrapped 360° about the mandrel. A rotor 11 in the longitudinal center of the mandrel carries a magnetic head 12 to transversely scan the helically wrapped tape 32. Entry and exit ramps 16 and 22 on the mandrel are provided where the tape enters and exits the mandrel. The function of these ramps is to lift the edge of the tape adjacent the path of the rotating head 12 as the head crosses the edges of the tape 32. This lifting by the ramps prevents the head from striking the edges of the tape and thus damaging the head and the tape. Both the ramps and the mandrel are made from porous material so as to be air bearing.